United States Patent [19]

Lalancette

[11] 4,142,459
[45] Mar. 6, 1979

[54] TOASTER FOR STEP-BY-STEP TOASTING

[76] Inventor: Lionel Lalancette, 241 de la Bretagne St., Jonquiére, Canada

[21] Appl. No.: 804,803

[22] Filed: Jun. 8, 1977

[51] Int. Cl.² ............................................. A47J 37/08
[52] U.S. Cl. ........................................ 99/334; 99/338; 99/387; 99/401; 99/391; 99/393; 99/443 C
[58] Field of Search .................. 99/329 RT, 386, 387, 99/401, 326, 334, 338, 385, 389, 391, 393, 443 C

[56] References Cited

U.S. PATENT DOCUMENTS

| 1,530,387 | 3/1925  | Marra      | 99/387     |
| 1,667,988 | 5/1928  | Richardson | 99/387     |
| 1,691,361 | 11/1928 | Roberts    | 99/386     |
| 2,036,826 | 4/1936  | Peters     | 99/386     |
| 2,465,577 | 3/1949  | Cox        | 99/329 R T |
| 2,588,851 | 3/1952  | Kompass    | 99/386     |

FOREIGN PATENT DOCUMENTS

| 2343405 | 3/1975 | Fed. Rep. of Germany | 99/386 |
| 2501667 | 7/1976 | Fed. Rep. of Germany | 99/386 |

Primary Examiner—Billy J. Wilhite

[57] ABSTRACT

A toaster characterized by a compact construction and low energy consumption achieved by a shallow toasting portion foldable against a wall mounting portion and by toasting of the slices of bread in zones step-by-step across the breadth of the slices of bread by edgewise displacement of the slices of bread each in a toasting slot extending through the shallow toasting portion and between two elongated heating elements and transversely to the latter with a heat sensitive device controlling even toasting of the zones and stepwise displacement of the slice of bread. The toaster includes a step-by-step actuation mechanism mounted in the wall mounting portion and displacing a toast support toward and away relative to the toasting slot. In one embodiment, the toaster further includes a rest for slices of bread, movable toward the toasting slot, a mechanism to move the rest in response to completion of a toasting cycle, and a mechanism to fold the rest in response to folding of the toasting portion against the wall mounting portion.

22 Claims, 33 Drawing Figures

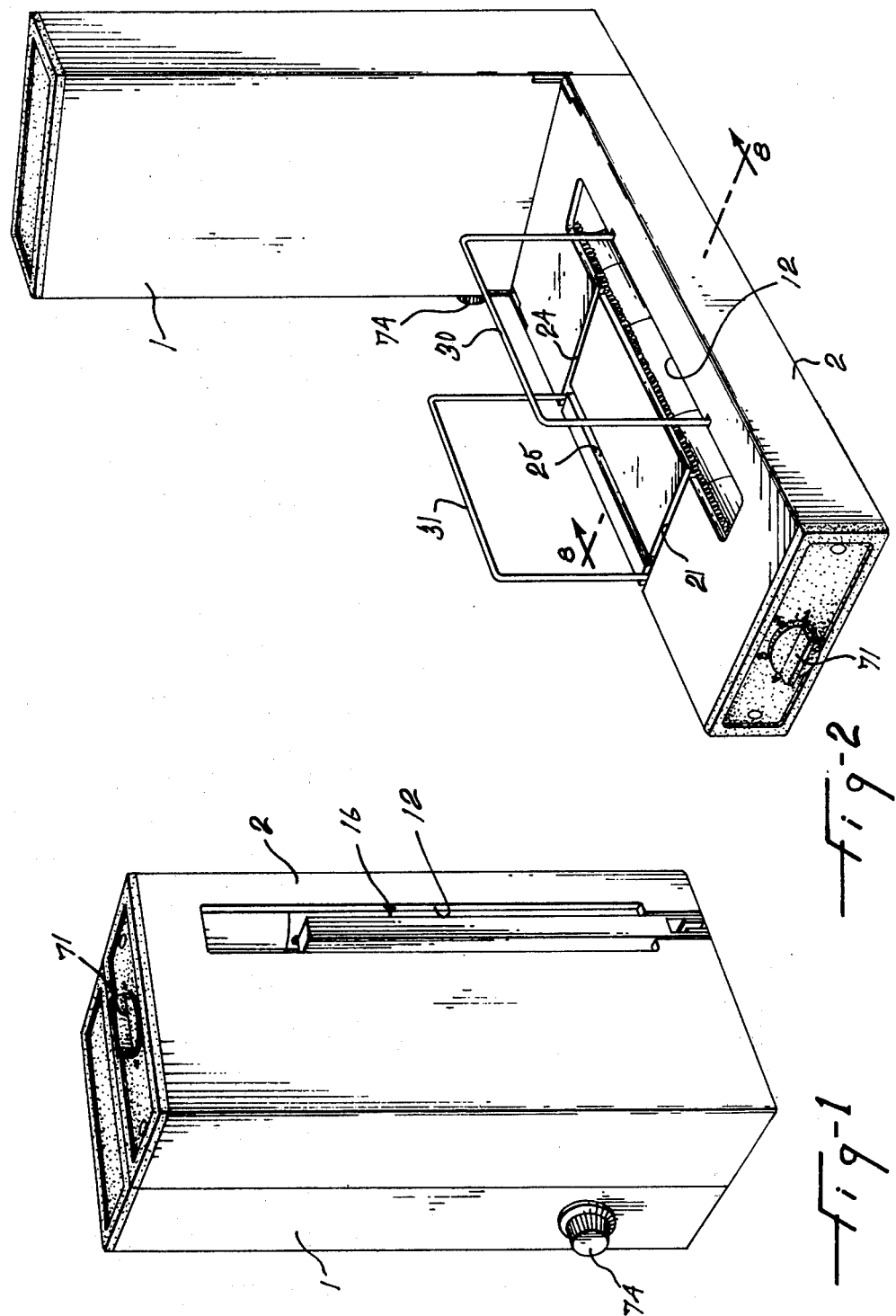

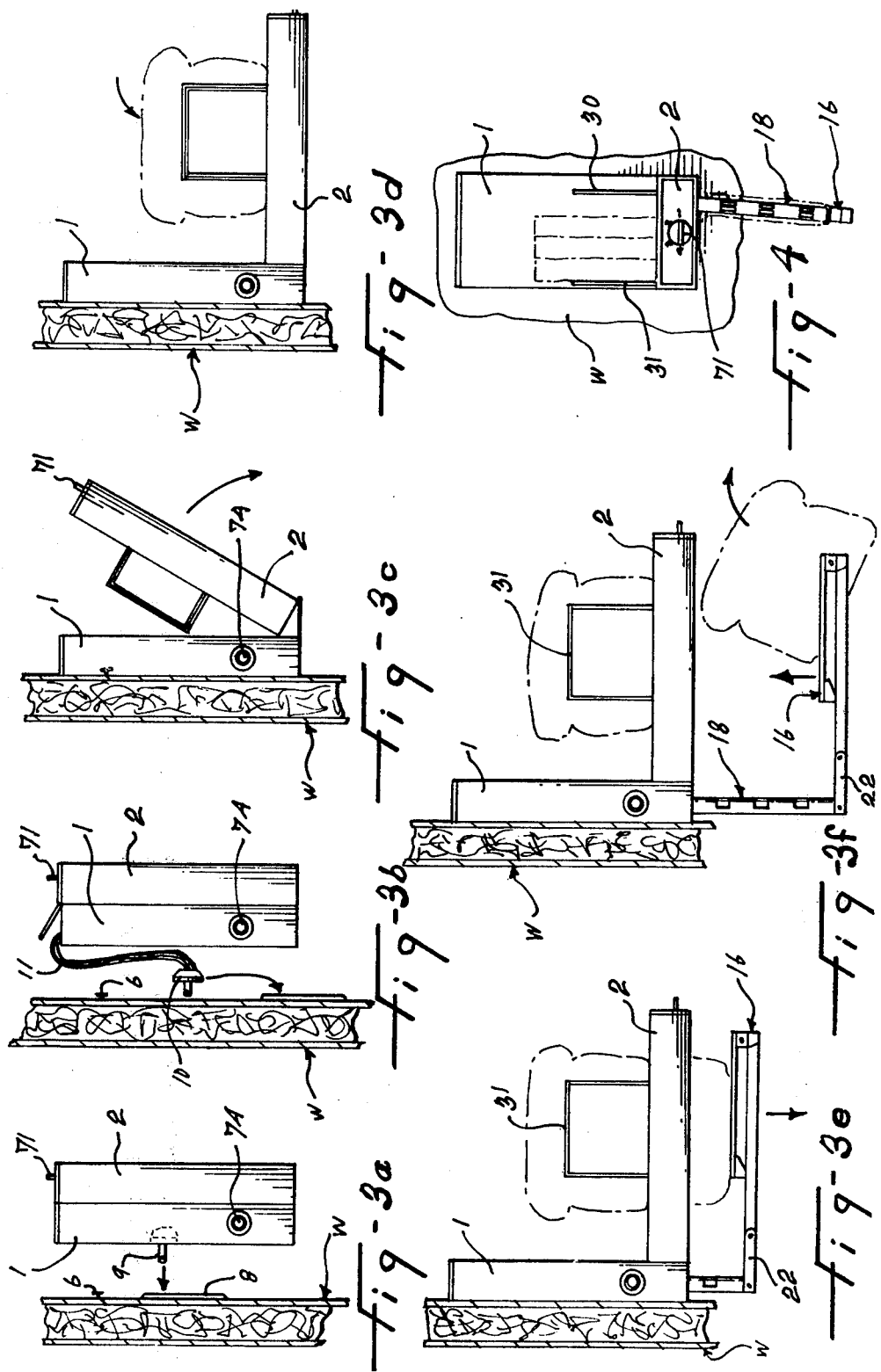

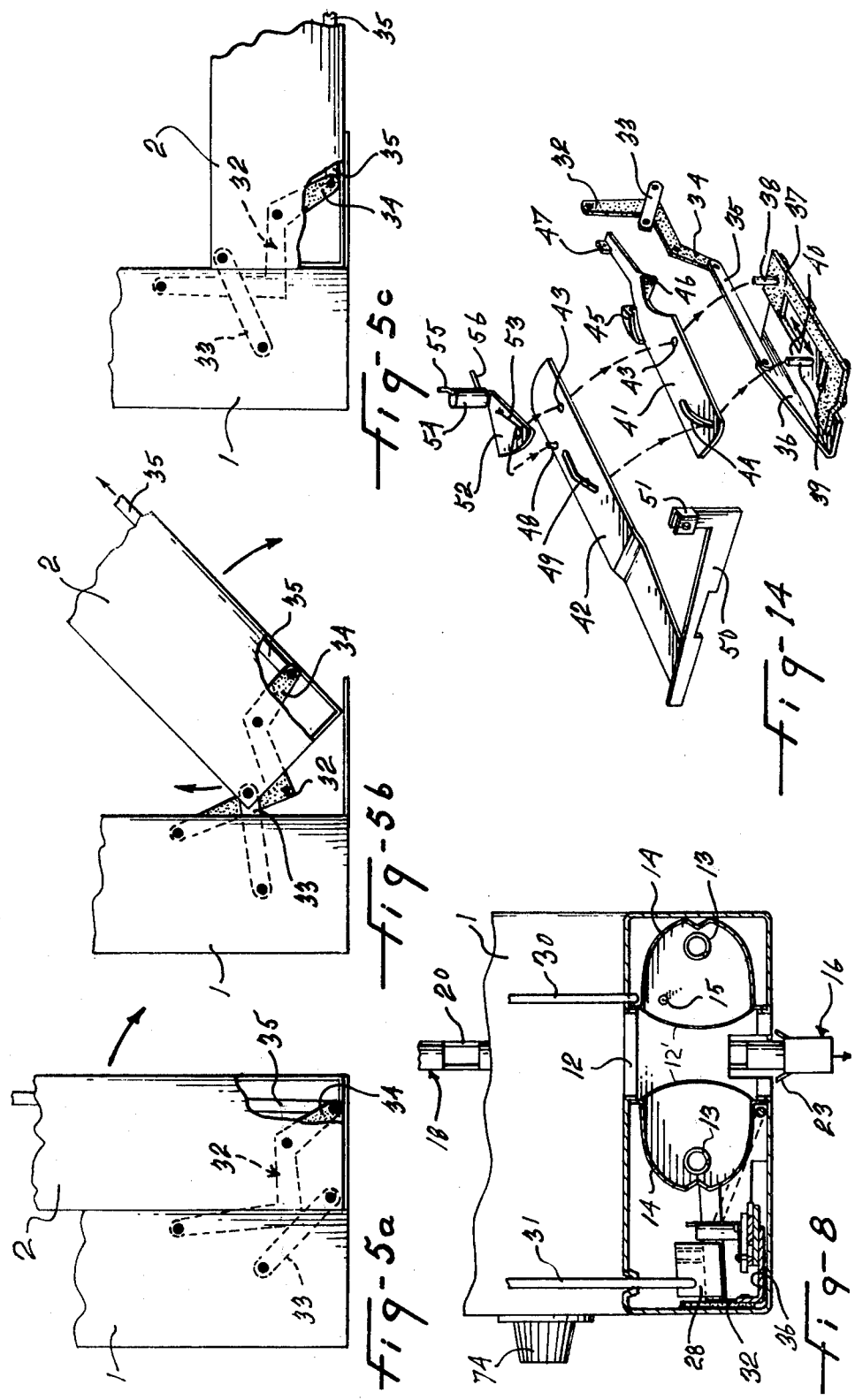

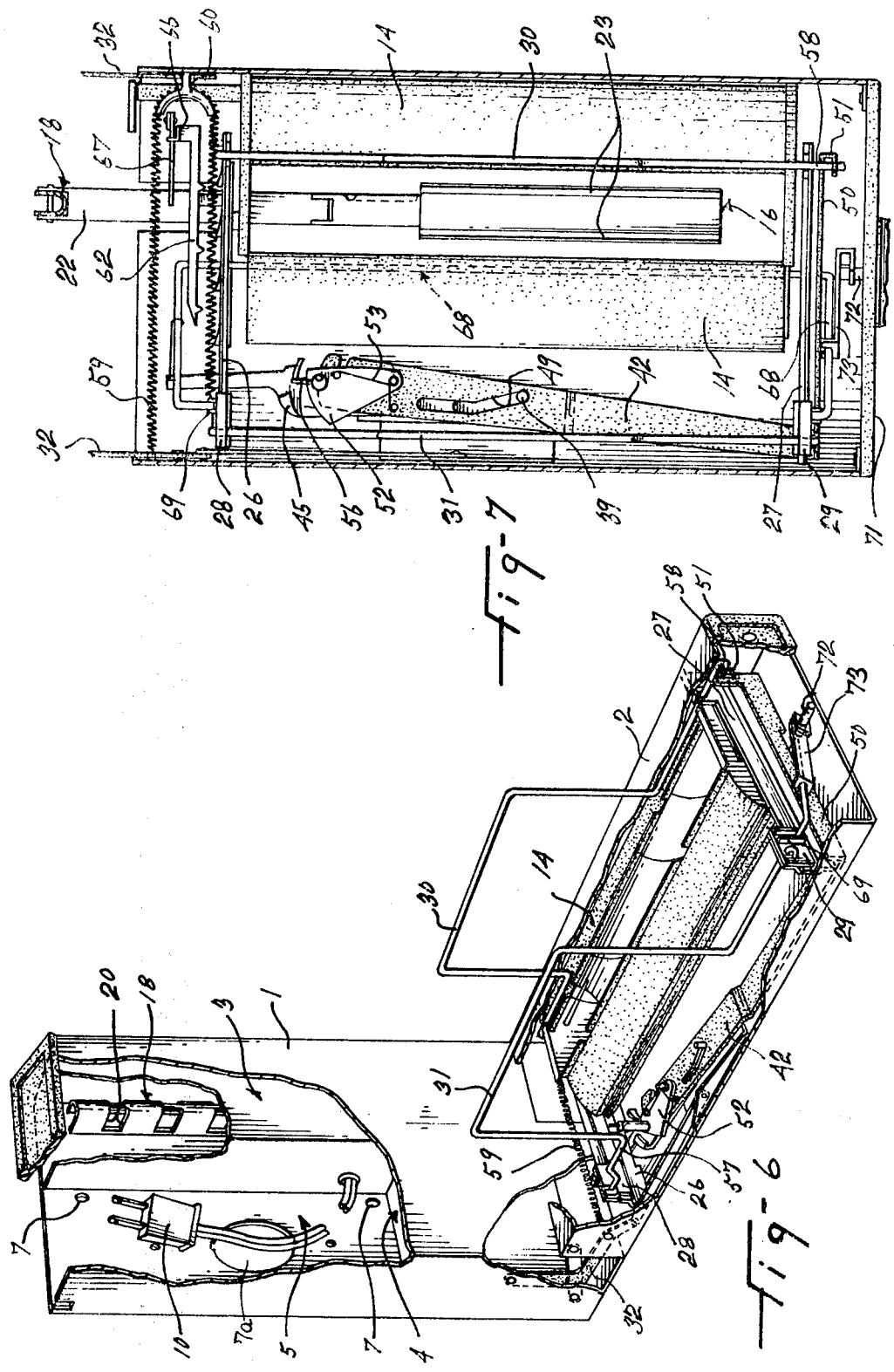

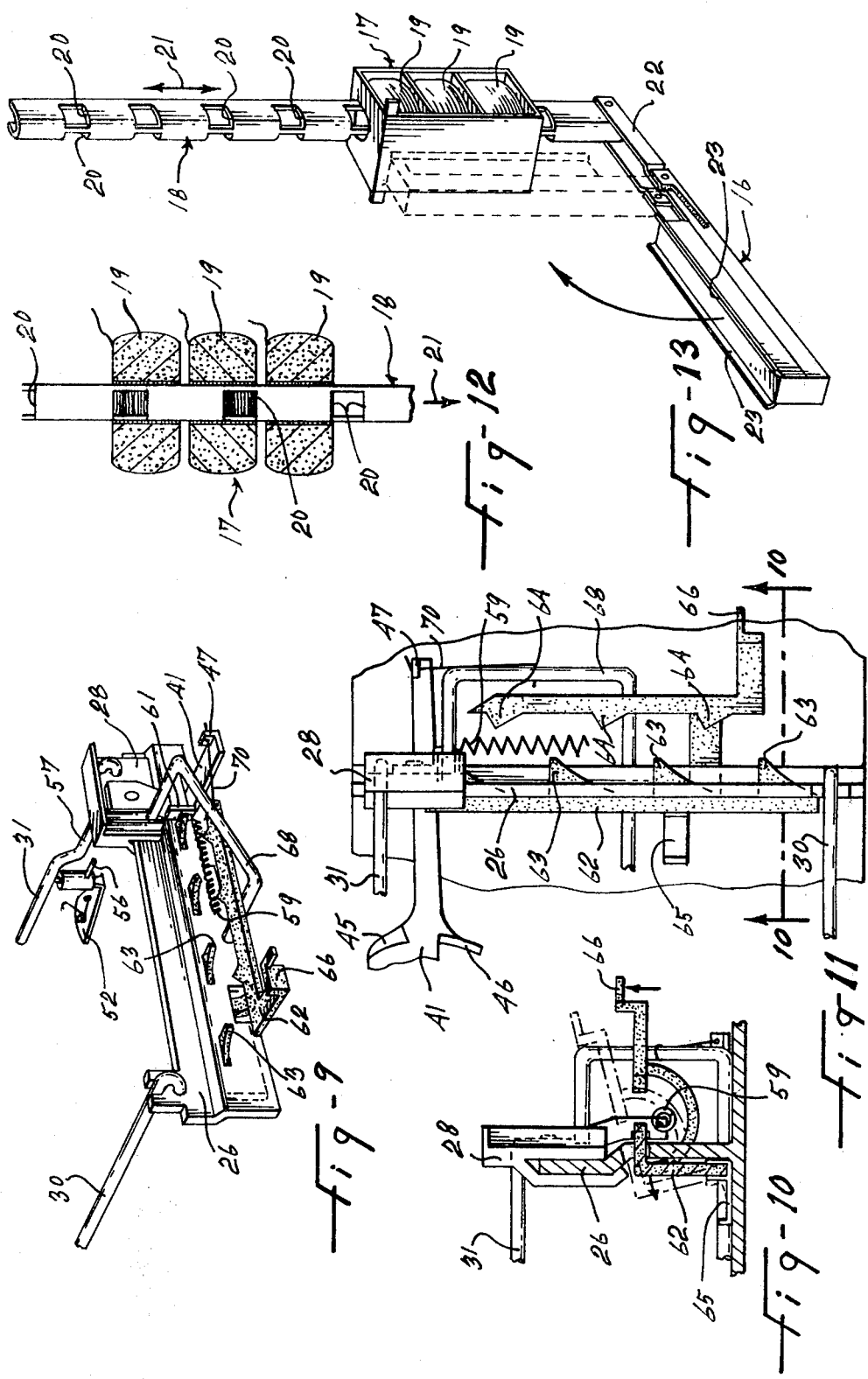

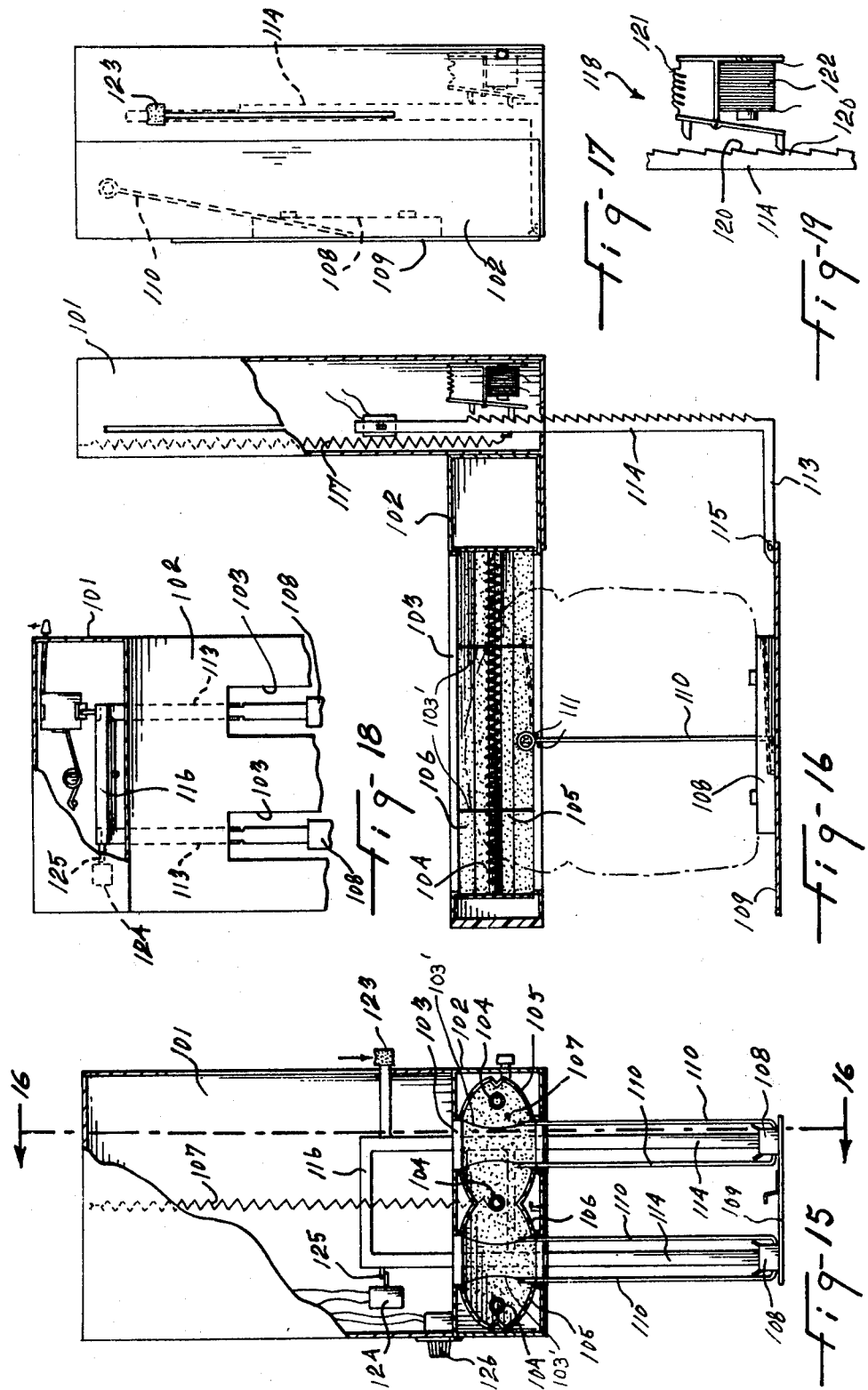

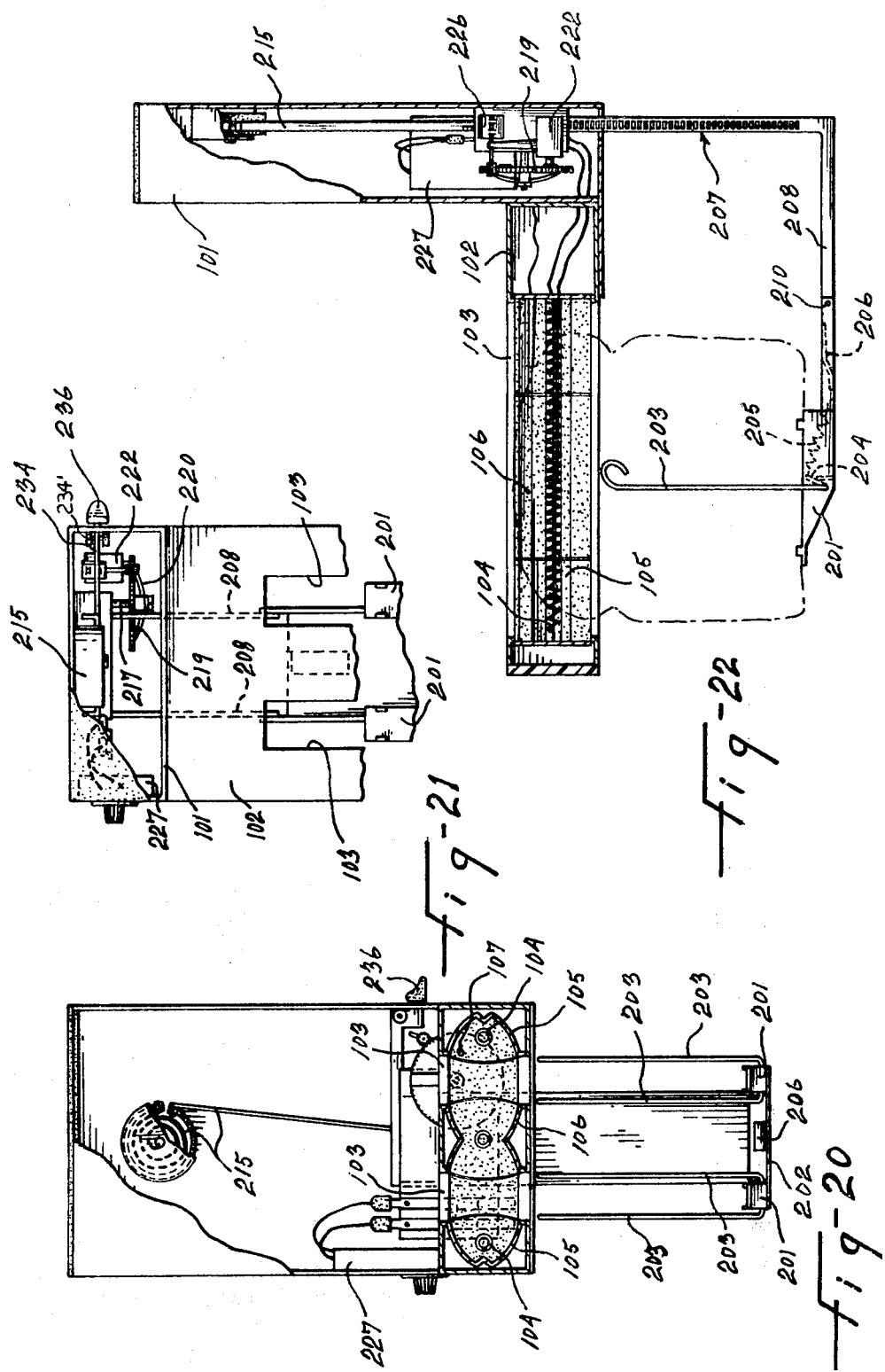

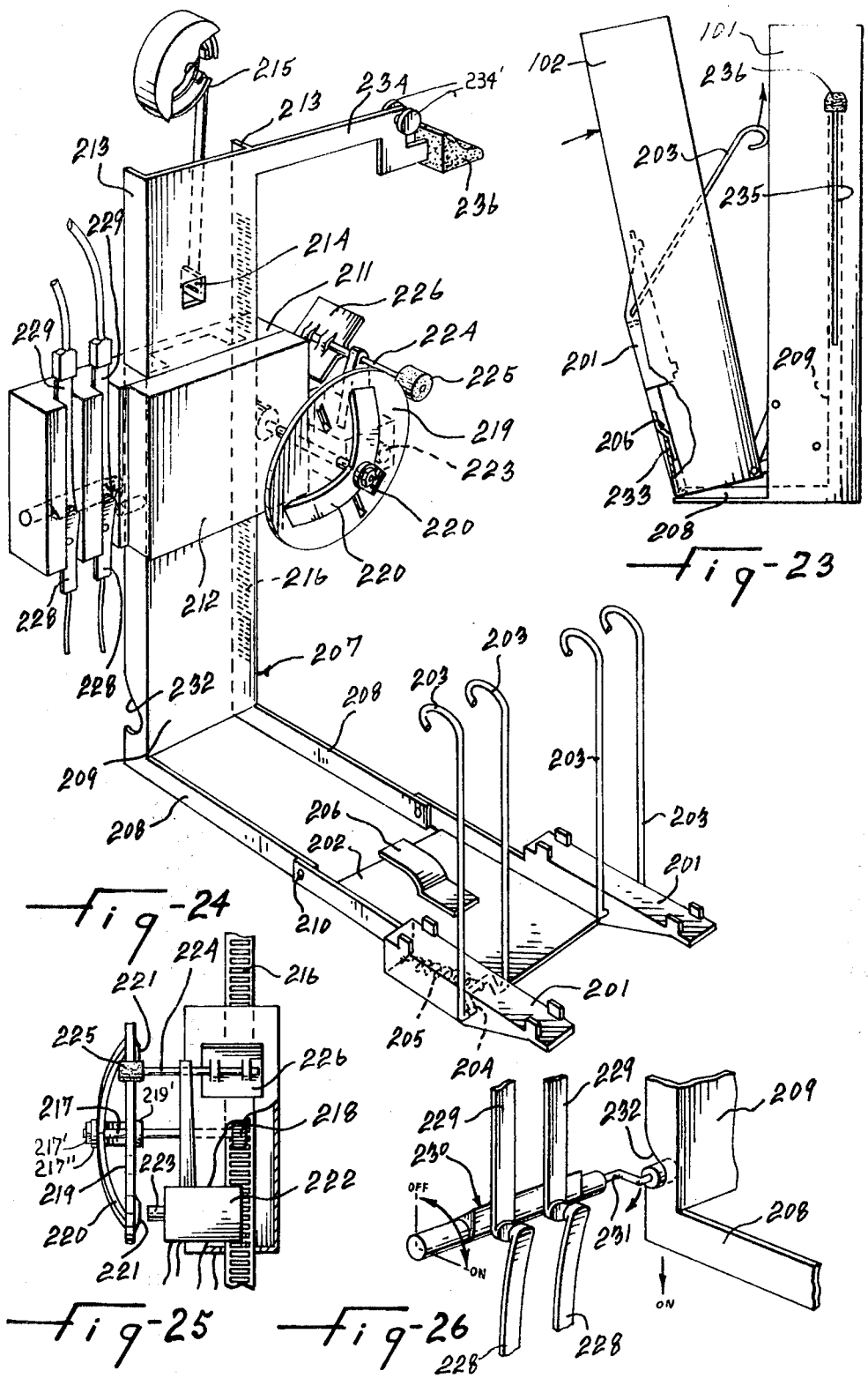

TOASTER FOR STEP-BY-STEP TOASTING

This invention relates to a toaster for slices of bread or the like.

The conventional toaster is provided with one or more slots into which a complete slice of bread engages and is toasted. Such toaster is therefore large enough to fully contain a slice of bread in each slot thereof and uses enough electric energy to heat the corresponding and relatively large electric toasting elements and associated adjoining mass of the toaster. There results a toaster which uses a fair amount of space on the kitchen counter and which is not conceived in view of energy conservation.

It is a general object of the present invention to provide a toaster which serves energy and space.

It is a general object of the present invention to provide a toaster which does not need a supporting table, kitchen counter, or the like and thus frees the kitchen counter for something else.

It is a more specific object of the present invention to provide a toaster which mounts against a wall to free the kitchen counter and which is compact for a minimum of encumbrance.

It is another object of the present invention to provide a toaster which toasts the slices of bread or the like in zones step-by-step across the breadth of the slices to require smaller heating elements using less energy and to require only a shallow enclosure foldable flat relative to a wall for a minimum of space and encumbrance.

It is a further object of the present invention to provide a toaster wherein zones are successively and evenly toasted across the breadth of the slice of bread in response to a heat sensitive device controlling even toasting of these zones and stepwise displacement of the slice of bread from one zone to another.

It is still another object of the present invention to provide a toaster of the above type wherein slices of bread are automatically fed into the toasting slot.

The above and other objects and advantages of the present invention will be better understood with reference to the following detailed description of preferred embodiments thereof which are illustrated, by way of examples, in the accompanying drawings; in which:

FIGS. 1 and 2 are perspective views of a toaster according to a first embodiment of the present invention and shown in closed and open positions respectively;

FIGS. 3a to 3f inclusive are side views of the toaster of FIGS. 1 and 2 showing sequences of use thereof respectively;

FIG. 4 is a front view of the same toaster fixed to a wall and in open operative position;

FIGS. 5a, 5b, and 5c are partial side views of the same toaster illustrating different sequential positions of the hinge mechanism;

FIG. 6 is a perspective view of the same toaster in open position and with parts broken away to define the internal structure;

FIG. 7 is a top plan view of the toasting portion of the toaster with the top of the enclosure broken away;

FIG. 8, on the same sheet of drawings as FIGS. 5a, 5b, and 5c, is a cross-sectional view of the toaster as seen along line 8—8 in FIG. 2;

FIG. 9 is a perspective view of one end of the rests for the slices of bread and with the associated detent assembly;

FIG. 10 is a cross-sectional view as seen along line 10—10 in FIG. 11;

FIG. 11 is a top plan view of the elements of FIG. 9;

FIG. 12 is a cross-sectional view of a linear motor forming part of the toaster of the preceding Figures;

FIG. 13 is a perspective view of the linear motor in association with a support for a slice of bread while toasting thereof;

FIG. 14, on the same sheet as FIGS. 5a, 5b, 5c and 8, is a perspective and exploded view of a folding mechanism for the rests for the slices of bread;

FIG. 15 is a front elevation view of a toaster according to a second embodiment of the present invention and with parts broken away to define the internal elements of this toaster;

FIG. 16 is a side elevation view of this other toaster as seen along line 16—16 in FIG. 15;

FIG. 17 is a side view of this other toaster shown in closed inoperative position;

FIG. 18 is a partial top view of this other toaster with parts broken away;

FIG. 19 is an enlarged view of the detent assembly of FIG. 16;

FIG. 20 is a front elevation view of a toaster according to a third embodiment of the present invention and with parts broken away to define the internal elements of this toaster;

FIG. 21 is a partial top view of the toaster of FIG. 20 with parts broken away;

FIG. 22 is a side elevation view of the toaster of FIG. 20 with parts broken away to show the internal elements;

FIG. 23 is a side elevation view of the third toaster in the process of being closed;

FIG. 24 is a perspective view of the distinctive internal elements of the third toaster as compared to the the toasters of FIGS. 1 to 19 inclusive;

FIG. 25 is an elevation view of a detent system forming part of the third toaster and producing the stepwise advance of the slice of bread in the toasting slot; and FIG. 26 is an enlarged view of a mechanically actuated switch to automatically de-energize the toasting elements at the end of the toasting cycle.

The toaster according to the embodiment illustrated in FIGS. 1 to 14 inclusive includes a body or enclosure formed of a wall mounting portion 1 and a toasting portion 2. Each of these enclosure portions 1 and 2 is of generally rectangular or box-like shape defining a pair of opposite major faces, opposite sides, and opposite ends.

The wall mounting portion 1 is partitioned to define a motor compartment 3, an electronics compartment 4 and a plugging cord compartment 5, as shown in FIG. 6. As best shown in FIGS. 3a to 3f, the wall mounting portion 1 has one of its opposite major faces fixed against a wall W of the kitchen, such as above the kitchen counter. For instance, the wall mounting portion 1 may be supported by screws 6 in the wall W projecting in the holes 7, shown in FIG. 6. The toaster may be plugged in an electric wall outlet 8, either as shown in FIG. 3a or in FIG. 3b. In FIG. 3a, the wall mounting portion 1 has the plug 9 rigidly fixed thereto and projecting therefrom for engagement in the wall outlet 8. In FIG. 3b, the plug 10 is fixed to the free end of the electric cord 11. Knock-out 7a can be removed to directly connect the toaster into an electric box mounted in wall W.

The toasting portion 2 of the toaster enclosure is formed with a slot 12 extending therethrough from one to the other of the two opposite major faces thereof. It must be noted that each of the two enclosure portions 1 and 2 is shallow such that, for instance, the toasting portion 2 has a thickness between the two major faces thereof which is many times or manifold smaller than the breadth of a conventional slice of bread. Thus, the slot 12 is of sufficient size for edgewise passage of a slice of bread therethrough, but such that only a portion of the slice of bread is in the slot at anyone time.

An electric toasting assembly is mounted in the toasting portion 2 and includes a pair of elongated electric toasting elements 13, each preferably enclosed in a tube of tempered glass for its protection. These toasting elements 13 extend lengthwise longitudinally of the slot 12 and on opposite sides respectively of the latter. A reflector 14 is positioned along each toasting element 13 to reflect the heat thereof toward the slot 12 and thus against the corresponding face of a slice of bread operatively positioned in the slot. A thermocouple 15 is mounted in at least one of the reflectors 14 to measure the heat of toasting produced by the toasting elements 13.

A support 16 is provided to carry a slice of bread during the edgewise displacement thereof in the slot 12. This supports 16 and the actuating mechanism thereof will be defined in details with reference to FIGS. 3e, 3f, 4, 7, 8, 12, and 13. The actuation mechanism includes a linear induction motor 17 having a movable core 18 acting as the shank portion of the support 16 and mounted in the compartment 3 of the wall mounting portion 1. The motor 17 includes three coils 19 engaged around the elongated core 18 in predetermined spaced apart relationship. The movable elongated core 18 is constituted of a metal rod of U shape transverse cross-section having apertures 20 therein spaced from each other a greater distance than the coils 19, as seen in FIG. 12. As known with this type of motor, the sequential energization of the coils 19 produces stepwise and endwise displacement of the core 18 as shown by the arrows 21, in FIGS. 12 and 13.

As is known in the art for this type of motor, the displacement of the movable core is produced by the magnetic action of the properly energized coil which is on the corresponding portion of the core. This corresponding portion of the core or rod is thus caused to move to symmetrically register with the corresponding coil. For each energization of each coil, there is thus produced a one-step displacement of the rod 18.

A bracket 22 is rigidly fixed to the lower end of the rod 18 and projects endwise therefrom in alignment with the slot 12. The support 16 is pivoted at one end to the outer end of the bracket 22 about a transverse axis relative to the latter and to the slot 12. The support 16 is provided with ridges 23 along the upper lateral edges thereof to laterally restrain the slice of bread thereon. It must be seen that as the motor 16 is actuated, there is produced a step-by-step displacement of the rod 18 and the support 16 causing the slice of bread operatively positioned on the support to progress edgewise in the slot 12 between the toasting elements 13. In this embodiment, the toasting is done between each downward and stepwise displacement of the support 16 and such that zones of the slice of bread are successively toasted from the bottom to the top of the slice of bread. Fine guide wires 12' (FIG. 8) center the bread slice during toasting. The thermocouple 15 measures the toasting heat and is connected to an amplifier and a pulse generator which energizes the motor 17. As sufficient heat has been supplied to toast each zone of the slice of bread, the pulse generator generates an appropriate pulse in one of the coils 19 to produce lowering of the support 16 one step and the toasting of the following zone of the slice of bread. When the full slice has been toasted, it clears the slot 12 below the toasting portion 2 and falls on the kitchen counter or on a plate purposely positioned for that purpose under the toaster. Due to the lateral inclination of core 18, as shown in FIG. 4, the toast will always fall on the same side of support 16.

A pair of slots 24 extend in the top major face of the toasting portion 2, transversely to the slot 12. Another slot 25 joins the slots 24 to each other. A pair of slideway members 26 and 27 are fixedly mounted in the toasting portion 2 and extend transversely to the latter at the opposite ends respectively of the toasting slot 12. A pair of slide members 28 and 29 are slidable on the slideway members 26 and 27, respectively.

A first rest 30 for slices of bread is made of a generally U-shape wire and is pivoted at its opposite ends to the slideway members 26 and 27 on one side of the slot 12. A second rest 31 for slices of bread is made of a generally U-shape wire and is pivoted at its opposite ends to the slice members 28 and 29 on the other side of the slot 12 relative to the rest 30. It must be noted that the rest 30 merely pivots relative to the toasting portion 2 while the rest 31 pivots and also slides with the slide members 28 and 29 toward and away relative to the toasting slot 12. As may be seen in FIG. 2, the rests 30 and 31 extend in the transverse slots 24 to fold down in inoperative and concealed position in these slots and slots 12 and 25 to close the toasting portion 12 against the wall mounting portion 1 as shown in FIGS. 1, 3a, and 3b.

A hinge mechanism, as best shown in FIGS. 5a, 5b, 5c, 6 and 14 pivotally connects the two enclosure portions 1 and 2 and also controls the automatic folding and unfolding of the rests 30 and 31 in response to closing and opening respectively of the toasting portion 2. This folding and unfolding is achieved through a folding mechanism best shown in details in FIG. 14.

The hinge mechanism includes along each side of the enclosure portions 1 and 2, a hinge lever 32 and a link 33. The latter is merely pivoted to the two portions 1 and 2 at its opposite ends respectively. The hinge lever 32 is also pivoted to the two portions 1 and 2 but it also includes a projection or lever portion 34 outwardly of the two above-mentioned pivot axes thereof. The outer end of the lever portion 34 is pivotally connected to a rigid link or rod 35 extending lengthwise longitudinally of the toasting slot 12. As best seen in FIG. 14, the folding mechanism includes a slide 36 which is pivotally connected to the actuating rod 35 to be slidably displaced by the latter. This slide 36 is guided by a slideway member 37 fixedly secured in the toasting portion 2. The slide 36 and the slideway member 37 are provided with the pair of posts 38 and 39 respectively. It will be readily understood that the post 38 is fixed while the post 39 is merely displaceable in the direction of the arrow 40 bodily with the slide 36 and longitudinally with respect to the toasting slot 12. A pair of actuating members or arms 41 and 42 are superposed and pivotally engaged over the fixed post 38 which is operatively engaged in the hole 43 of each actuating member. The underlying actuating member 41 is formed with an arc-shaped slot 44 in which is engaged the movable post 39. The underlying actuating member 41 is also provided with a pair of cam portions 45 and 46 at the opposite end thereof relative to the arc-shaped slot 44. An ear or lug 47 is formed at this opposite end of the actuating arm 41. The overlying actuating arm 42 is formed with an abutment post or projection 48 on the upper face thereof, an angular slot 49 therethrough, and a lateral projection 50. The movable post 39 is slidably engaged in the angular shape slot 49. The lateral projection 50 extends along the slideway member 27 and forms a connecting lug 51 at the outer end thereof. A pivotal member 52 is pivotally engaged with the fixed post 38 and is inwardly biased by a spring wire abutting against the abutment post 48. A cylindrical member 54 projects axially upright from the pivotal member 52 and is formed or provided with an upright finger 55 and an horizontal finger 56. The upright finger 55 is adapted to laterally engage a crank portion 57 of the movable rest 31 and to operatively unfold the latter. The horizontal finger 56 is adapted to engage the cam portions 45 and 46 and to cause release of the movable rest 31 by the upright finger 55. The rest 30 also includes a crank portion 58 connected to the lug 51 of the lateral projection 50.

As may seen best in FIGS. 6, 7, and 14, when the toasting portion 2 is opened as sequentially shown by the FIGS. 5a, 5b, and 5c, the lever portion 34 of the hinge lever 32 outwardly pushes the rod 35 and the slide 36 with a corresponding outward displacement of the actuating or displaceable post 39. The latter produces a camming action in the arc-shaped slot 44 and in the angular slot 49, whereby the actuating arms 41 and 42 have their lugs or ears 47 and 51, respectively, both pivoting inward. The two rests 30 and 31 are thus caused to unfold to their upright position. The arc-shaped slot 44, due to its shape, produces immediate start of the folding and unfolding of the corresponding rest 31 while the angular slot 49 produces faster opening and delayed closing of the corresponding rest 30. Thus, the rest 30 folds over the rest 31 without interference one with the other upon opening or closing thereof.

A mechanism is provided to displace the movable rest 31 toward the toasting slot 12 and to thus automatically feed slices of bread one by one in response to completion of toasting of a slice of bread. A predetermined number of slices of bread, such as 4, may be positioned between the rests 30 and 31 with three on toasting portion 2 and one within slot 12; the slices are successively and automatically toasted by lateral displacement of the rest 31 toward the slot 12.

This actuating mechanism for the movable rest 31 includes an actuator for the latter, which constitutes a tension spring 59, that is of sufficient length to displace the rest 31 the required distance toward the slot 12. For this purpose, the spring 59 covers substantially twice the width of the toasting portion 2 and is slidably carried at mid-length by a yoke 60 fixed to the toasting portion. Thus, both ends of this spring 59 are secured adjacent the same side of the toating portion 2 opposite to the side holding the yoke 60. One end of the spring 59 is secured to this same side, while the other end is hooked or secured to a lug 61 displaceable with the slides 28 and 29. A detent assembly regulates the displacement of the slides 28 and 29 along the slideway members 26 and 27. This detent assembly includes a detent member 62 which is provided with two series of teeth 63 and 64. These two series of teeth are mutually spaced apart and facing each other. The teeth 63 are of the ratchet type to positively hold the lug 61 while the teeth 64 are interposed longitudinally relative to the teeth 63. The teeth 63 laterally engage in a corresponding series of apertures in the slideway member 26. The detent member 62 is laterally rockable against the bias of a spring clip 65 which urges the teeth 63 toward projection in the aforementioned apertures of the slideway member 26 and toward interception of the lug 61. The detent member 62 is formed with an actuating projection 66 on opposite side thereof relative to the spring clip 65. An actuating arm 67 is pivoted in the toasting portion 2 under the actuating projection 66 and is operatively engaged and pivoted by the bracket 22 when the support 16 is returned to its uppermost starting position. When the toasting of a slice of bread has been completed, further downward movement of the rod 18 and the support 16 releases the toast and operates a reversal switch, not shown, which energizes an appropriate pulse circuit to produce quick sequential energization of the coils 19 and return of the rod 18 and the support 16 to their uppermost position. It is then that the bracket 22 actuates the trigger or actuating member 67. The detent member 62 is thus pivoted against the bias of the spring clip 65 to release the lug 61 and allow the actuating spring 59 to displace the slides 28 and 29 and consequently also the movable rest 31 one step toward the slot 12. This causes another slice of bread to be pushed by the movable rest 31 into the slot 12. Another toasting cycle then starts.

A manual control mechanism is provided to manually select the number of slices to be toasted. This manual control mechanism includes a generally U shape wire 68 having its central portion extending longitudinally of the toasting portion 2 and its opposite ends slidable in a vertical guideway 69 of the corresponding slides 28 and 29 respectively. The U shape wire 68 is connected to the ear or lug 47 of the rest actuating arm 41 by a spring wire 70. A manual control knob 71 is connected by a stub axle 72 to an arm 73 to rotate the latter. The arm 73 is connected to the U shape wire 68 to rotate therewith. Thus, the rotation of the knob 71 allows rotation or pivoting of the U shape wire 68 and a corresponding lateral displacement of the slides 28 and 29 and of the movable rest 31. This allows to select the number of slices of bread to be toasted.

The knob 74 is connected to the electronic circuit of the toaster to set the desired degree of toasting.

The support 16, as shown in FIG. 1, inoperatively folds and rests inside the toasting slot 12 when the toasting portion 2 is folded against the wall mounting portion The toaster of the embodiment illustrated in FIGS. 15 to 19 inclusive is also based on the same concept of a shallow toasting portion through which a slice of bread is displaced edgewise step-by-step to toast successive zones across the breadth of the slice in response to a heat sensitive device or thermocouple for uniform toasting of all the successive zones.

This toaster includes an enclosure or body formed of a wall mounting portion 101 and a toasting portion 102 which are of rectangular and shallow box-like construction as the enclosure portions 1 and 2 of the afore described embodiment. However, the enclosure portions 101 and 102 are relatively wider to accommodate two toasting slots 103 through the toasting portion 102. It must be noted that the mounting and plugging of the wall mounting portion 101 against a wall is not illustrated but is the same as for the wall mounting portion 1 and the elments 3 to 11 inclusive of the afore described embodiment. The toasting portion 102 also has a thickness between the two major faces thereof which is many times or manifold smaller than the breath of a conventional slice of bread.

An electric toasting assembly is mounted in the toasting portion 102 and includes three elongated toasting elements 104, each preferably enclosed in a tube of heat-resistant glass for its protection. A glass tube resisting to a 1500° C. and sold under the trade mark "Vicor-Glass", by Corning Glass Ltd., is suitable. These toasting elements 104 extend lengthwise longitudinally of the slots 103, on opposite sides and between these slots respectively. Reflectors 105 and 106 are positioned along the toasting elements 104 and duly directed to reflect the heat of the latter toward the toasting slots 103 and thus against the opposite faces of two slices of bread engaged edgewise in these toasting slots. Elements 104 and their protecting glass tube can be replaced by conventional toaster heating elements made narrower. A thermocouple 107 is mounted adjacent at least one of the toasting elements 104 to measure the heat and thus the toasting produced by the toasting elements. During toasting, the bread slices are centered relative to toasting elements by being slidably engaged by fine guide wires 103' secured to the edges of slots 103 and extending across reflectors 105, 106. A pair of elongated supports 108 register lengthwise with the toasting slots 103 respectively and are fixedly mounted on a plate 109 adapted to overlap and cover both toasting slots when the toasting portion 102 is in inoperative position. The two supports 108 are adapted to each carry a slide of bread edgewise thereon and in the corresponding toasting slot 103. A pair of bread slice-retaining wires 110 are pivotally connected on the opposite sides respectively of each support 108 and are slidably engaged in the corresponding slot 103. A pair of guide wires 111 operatively guide the retaining wires 110 during opening and closing of the toasting portion 102.

The supports 108 including the plate 109 are provided with an L-shape shank 112 having a pair of shorter horizontal portions 113 and a pair of upright portions 114. The shorter horizontal portions 113 are parallel and have the plate 109. pivotally connected to their outer end at 115. The two upright portions 114 are rigidly interconnected by a pair of cross members 116. An actuation spring 117 is connected to one cross member and upwardly biases the shank 112 and thus the supports 118.

A detent mechanism or assembly 118 regulates the upward displacement of the shank 112 and thus of the supports 108 to produce step-by-step upward displacement of the latter. This detent assembly include a detent member 119 having teeth engaging ratchet teeth 120 along the upright portions 114. A spring 121 biases the detent member 119 toward engagement of one pawl thereof with the upright portions 114. A solenoid 122 is operatively connected to the detent member 119 to disengage one pawl of the detent member 120 and to engage the other pawl with the teeth of the upright portions 114.

The thermocouple 107 is connected through an amplifier and a pulse generator to the solenoid 122 such that upon sufficient heating and toasting of one zone of each slice of bread on the supports 108, the solenoid is energized to release the upright portions 114 and allow upward displacement of the latter one step under the action of the actuation spring 117.

When the slices of bread in the slots 103 have been completely toasted stepwise zone after zone, the toasts are removed, the handle 123 is pushed down to reset the shank 112 in the lowered starting position. The switch 124 is then actuated by a finger 125 of the shank 112 to energize the electronic circuit through the thermocycle 107. A control knob 126 is connected to the electronic circuit to set the desired degree of toasting of the slices of bread.

The toaster of the embodiment illustrated in FIGS. 20 to 26 inclusive is also based on the same concept of a shallow toasting portion through which a slice of bread is displaced edgewise step-by-step to toast successive zones across the breadth of the slice in response to a heat sensitive device or thermocouple for uniform toasting of all the successive zones.

This toaster also includes an enclosure or body with the aforedescribed wall mounting portion 101, toasting portion 102, toasting slots 103, plugging, elements 3 to 11 inclusive, three elongated toasting elements 104, reflectors 105 and 106, and a thermocouple 107 or the like heat sensing device.

A pair of elongated supports 201 register lengthwise with the corresponding toasting slots 103 respectively and are fixedly mounted on a plate 202 adapted for bodily pivoting of the two bread or toast supports 201. The two supports 201 are adapted to each carry a slice of bread edgewise thereon and in the corresponding toasting slot 103. A pair of guide wires or retaining arms 203 are pivotally connected on the opposite sides respectively of each support 201 and slot 103 and slidably engage in the latter. Each pair of guide wires 203 are formed by the opposite ends of a wire having an intermediate portion 204 forming a crank relative to the pivot axis of the corresponding wires. A spring 205 is connected to each intermediate crank portion 204 and the corresponding support 201 to pivotally bias the corresponding pair of retaining arms 203 in erected operative position. A latch member 206 is fixed to the plate 202.

The supports 201 including the plate 202 are provided with an L-shape shank 207 having a pair of shorter horizontal portions 208 and a longer upright portion 209. The shorter horizontal portions 208 are parallel and have the supports 201 pivotally connected to their outer end at 210. The longer upright portion 209 is slidably guided in the wall mounting portion 101 by a pair of complementary blocks or bodies 211 and 212 which allow endwise upright sliding of this longer upright portion. The latter is of U-shape or channel cross-section defining a pair of lateral flanges 213 extending edgewise toward the wall or rear of the wall mounting portion. A lug 214 is cut into the upright portion 209 and rearwardly bent between the two lateral flanges 213. A coil spring 215 is fixed inside the wall mounting portion 101 and has its outer end attached to the lug 214. Thus, this coil spring 215 forms an actuator to upwardly bias and slide the upright portion 209 and, thus, the supports 201.

A detent mechanism or assembly, best shown in FIGS. 24 and 25, is connected to the upright portion 209 to produce stepwise sliding advance of the latter and of the slices of bread relative to the toasting slots 103. One lateral flange 213 of the upright portion 209 is provided with a series of slots to constitute a gear rack 216 extending lengthwise upright longitudinally of the upright portion. The detent mechanism includes a shaft 217 extending in a fore and aft direction in the wall mounting portion 201. An input gear 218 is fixed to the shaft 217 for bodily rotation therewith and in meshing engagement with the gear rack 216. A rotary member, in the form of a wheel 219, is mounted on the shaft 217 for rotation relative to the latter. A three-legged spring member 220 is fixedly mounted on the shaft 217 and axially biases wheel 219 into frictional clutching engagement with a backing washer 219' secured to shaft 217. Spring member 220 is retained on the end of shaft by a nut 217' and a washer 217" having a non-circular hole receiving a flat of shaft 217. A pair of lugs 221 are punched or cut in the wheel 219 and are bent to axially project from the rear face of this gear at diametrically opposite points of the latter. A solenoid 222 is juxtaposed to the rear face of the wheel 219 and a core 223 slidably extends in the solenoid to be electromagnetically actuated by the latter between extended stopping engagement with one lug 221 or retracted position clearing the way for the passage of one lug. The solenoid 222 is electrically connected to the corresponding thermocouple 107 to be timely controlled by the latter.

A speed controlling device, or governor, is connected to the gear 219 to slow the latter. This device includes a shaft 224 extending parallel to the shaft 217 and a small rubber wheel 225 rotatable with the shaft 224 and in noiseless frictional engagement with the wheel 219. A blade 226 is fixed to the shaft 224 to bodily rotate therewith and slows the latter and the wheel 219 upon frictional air resistance thereon.

An electric switch is mechanically connected to the upright portion 209 to be actuated by the latter. This electric switch is electrically connected on one side to the corresponding electric supply cord, not shown, through the manual control 227 and on the other side to the electric toasting elements 104. This switch includes two sets of contacts, each including a fixed contact 228 and a movable contact 229. A cam member 230 is rotatably mounted behind the two movable contacts 229 and axially extends transversely of the latter. The cam member 230 has a crank arm 231 connected thereto to rotate it. The other lateral flange 213, as compared to the one having the gear rack 216, is provided with a notch 232 arranged for engagement of the end of the crank arm 231 therein when the upright portion 209 is in the uppermost postion corresponding to the end of a toasting cycle, as shown in FIG. 26.

In this third embodiment, the toaster includes the same pivoting mechanism as in the other two embodiments and afore described in details.

When the toasting portion 102 is pivoted to its operative open position, the guide wires or retaining arms 203 are biased by the springs 205 from their collapsed position to their erected operative position. Simultaneously, the latch member 206 clears the edge 233 at the bottom of the toasting portion 102. This clearing action results from rearward displacement of the toasting portion 102 upon pivoting thereof. The supports 201 and the upright portion 209 are then in their uppermost position and the crank arm 231 is engaged in the notch 232. The cam member 230 then does not establish the electrical contacts through the switch, as shown in FIG. 26.

The upright portion 209 is provided with a lateral arm 234 which outwardly projects through a vertical slot 235 in the corresponding side of the wall mounting portion 101. A thumbpiece 236 is fixed on the outer end of the arm 234 to manually actuate the upright portion 209 and thus, the bread supports 201. By pushing down on the thumbpiece 236, the bread supports 201 are pushed downward and the crank arm 231 pivots out of the notch 232 causing the cam member 230 to establish the electrical contacts between the movable and the fixed contacts 228 and 229. During the downward movement of the upright portion 209, the gear rack 216 rotates the gear 218, the shaft 217, the spring member 220 and the wheel 219, since the detent core 223 acts as a ratchet on lugs 221 which are inclined on one side to allow their movement over core 223. The clutch formed by wheel 219 and backing washer 219' allows upward movement of upright portion 209 at any time by means of thumb piece 236, wheel 219 being then retained against rotation by core 223 engaging a lug 221. To prevent lateral displacement of portion 209 towards the right during pushing up or down on knob 236, a pair of idle wheels 234' fixed to member 234 bear on the inside surface of the casing wall on each side of slot 235 (see FIGS. 21, 23, 24).

As a zone of the slice of bread on its support 201 is adequately toasted, the thermocouple 107 activates the solenoid 222 which retracts the core 223 sufficiently to allow rotation of the gear 219 a half-turn to the next lug 221 abutting against the detent core 223. The rotation of the gear 219 is produced by concurrent upward displacement of the upright portion 209. The complete toasting cycle is thus produced by stepwise upward displacement of the supports 201 and the slices of bread thereon until all the zones of the slices of bread have been successively toasted and the supports 201 and portion 209 have reached the uppermost position. Then, the crank arm 231 falls in the notch 232 and the cam 230 allows the movable contacts 229 to spring away from engagement with the fixed contacts 228.

This toaster then is de-activated. Downward displacement of the thumb piece 236 is required to produce another toasting cycle.

It has been determined in practice that an energy consumption of only about 500–600 watts is required to produce two toasts zone by zone as aforedescribed, as compared with the 1080 watts required for an ordinary 2-slot toaster. Thus, two times less energy is consumed, since toasting time is about the same as for the ordinary toaster.

Besides, the afore-described toasters are some six times smaller than a conventional 4-slot toaster.

What I claim is:

1. A toaster for step-by-step toasting comprising a body having a thickness between a pair of opposite faces thereof manifold smaller than the breadth of a slice of bread and having a slot extending through said body from one to the other of said opposite faces, an elongated support movably connected to said body in registry with said slot and operatively carrying a slice of bread edgewise thereon in alignment with said slot, actuation means connected to said body and to said support and operatively displacing the latter stepwise laterally to said slot, a pair of elongated electric toasting elements mounted on said body and extending along and on opposite sides respectively of said slot, and a heat sensitive device mounted on said body adjacent said slot and connected to said actuation means, whereby successive fractional zones of the slice of bread are toasted step-by-step across the breadth of the slice of bread during stepwise advance of said successive fractional zones through said slot upon operation of said actuation means by said heat sensitive device in response to the heat of toasting against a preceding fractional zone.

2. A toaster as defined in claim 1, wherein said body includes a toasting portion and a wall mounting portion, and a hinge mechanism pivotally connects said toasting portion to said wall mounting portion and operatively pivots said toasting portion to an inoperative position flat against said wall mounting portion.

3. A toaster as defined in claim 2, wherein said actuation means is mounted into said wall mounting portion, an electrical plug is connected to said actuation means and outwardly projects for operative plugging in a wall outlet.

4. A toaster as defined in claim 2, wherein said elongated support includes a shank portion displaceably mounted into said wall mounting portion and an elongated carrying portion longitudinally registering with said slot, pivoted to said shank portion, and pivotally engaging in said slot upon closing of said toasting portion against said wall mounting portion.

5. A toaster as defined in claim 4, wherein said actuation means includes an amplifier, a pulse generator, and an electrical actuator, said heat sensitive device constitutes a thermocouple connected to said electrical actuator through said amplifier and said pulse generator, and said amplifier, pulse generator, and electrical actuator are mounted in said wall mounting portion.

6. A toaster as defined in claim 5, wherein a spring is mounted in said wall mounting portion, connected to said elongated support, and operatively biases said support toward said slot, said shank portion has ratchet teeth extending along the length thereof, and said electrical actuator includes a spring biased pawl operatively engaging said ratchet teeth and a solenoid operatively connected to said pawl and actuating the latter for stepwise displacement of said support toward said slot under the bias of said spring.

7. A toaster as defined in claim 2, further including a movable rest mounted on said body, displaceable laterally of said slot, and operatively holding slices of bread edgewise on said body and pushing the slices laterally toward edgewise engagement into said slot, a folding mechanism connected to said movable rest and to said hinge mechanism and retractably folding said movable rest in response to the action of said hinge mechanism upon closing of said toasting portion against said wall mounting portion.

8. A toaster as defined in claim 7, wherein said movable rest constitutes a first rest pivoted to said toasting portion on one side of said slot, a second rest is pivoted to said toasting portion on adjacent the other side of said slot, said folding mechanism includes an actuation member connected to said hinge mechanism and operatively displaced by the latter upon opening and closing of said toasting portion relative to said wall mounting portion, a first rest actuating member is connected to said first rest and to said actuation member, a second rest actuating member is connected to said second rest and to said actuation member and operatively produce pivotal folding and unfolding of said rests in response to closing and opening respectively of said toasting portion.

9. A toaster as defined in claim 8, wherein each of said rests includes a crank portion, an intermediate rest actuating member operatively connects said first rest actuating member to said first rest, cam means is provided on said first rest actuating member, engages said intermediate rest actuating member, and disengages the latter from said first rest upon pivotal unfolding of the latter.

10. A toaster as defined in claim 9, wherein said first rest includes a pair of opposite ends, a slide pivotally carries each of said opposite ends and is slidable transversely to said slot, and a manual control is connected to said slides and operatively displaces the latter relative to said slot for toasting of a selected number of toasts.

11. A toaster as defined in claim 1, further including a movable rest mounted on said body, displaceable laterally of said slot, and operatively holding slices of bread edgewise on said body and pushing the slices laterally toward edgewise engagement into said slot.

12. A toaster as defined in claim 11, further including an actuating mechanism connected to said movable rest and operatively displacing the latter toward said slot upon completion of toasting of one slice of bread.

13. A toaster as defined in claim 12, wherein said actuating mechanism includes a detent assembly and an actuator operatively connected to said movable rest and producing stepwise displacement thereof toward said slot.

14. A toaster as defined in claim 13, wherein said actuating mechanism includes a trigger actuated by said support, engaging said detent assembly, and operating the latter in response to each cycle of displacement of said support relative to said slot, said actuator includes a spring connected to said movable rest and operatively biasing the latter toward said slot, and said detent assembly includes a rocking member having a first and a second rows of detents successively holding said rest in one of a plurality of positions relative to said slot.

15. A toaster as defined in claim 1, wherein said actuation means comprises an actuator device and a detent means operatively connected to said actuator device and producing stepwise operation thereof and advance of said elongated support laterally relative to said slot.

16. A toaster as defined in claim 15, wherein said detent means includes a rotary member geared to said elongated support for joint movement therewith under the action of said actuator device and a detent member selectively engageable with said rotary member and stopping the latter and the elongated support thereby producing joint stepwise advance of the elongated support and rotation of the rotary member.

17. A toaster as defined in claim 16, wherein said detent means includes at least one lug axially projecting from said rotary member, said detent member is selectively displaceable toward stopping engagement with said one lug and an electromagnetic actuator is connected to said detent member and to said heat sensitive device and releases the detent member from stopping engagement with said one lug in response to sensing sufficient heat of toasting by the heat sensitive device.

18. A toaster as defined in claim 17, wherein said actuator device constitutes a coil spring connected at the outer end to said elongated support and biasing the latter toward said advance thereof relative to said slot and said detent means includes a gear rack fixed to said elongated support and displaceable therewith endwise in the direction of advance thereof, an input gear meshing with said gear racks and rotatable by the latter, a shaft having said input gear fixed thereto for rotation therewith, said rotary member constituting a main driven gear mounted on said shaft coaxial and rotatable relative to said input gear, a spring member fixed to said shaft for bodily rotation therewith and axially biased into frictional clutching engagement with one axial face of the main driven gear, a pair of lugs including said one lug axially projecting from the other axial face of the main driven gear and diametrically opposite relative to each other, a solenoid constituting said electromagnetic actuator, and a movable core in said solenoid constituting said detent member and biased toward stopping engagement with either of said lugs.

19. A toaster as defined in claim 15, further including an electrical switch electrically connected to said electric toasting elements and mechanically connected to and actuated on and off by the elongated support.

20. A toaster as defined in claim 19, wherein said electric switch includes at least one set of a fixed contact and a movable contact, a cam member rotatably urging said movable contact in engagement with said fixed contact, a crank arm fixed to said cam member and operatively engaging said elongated support and pivoted by the latter upon displacement thereof between a fully advanced position and a fully retracted position relative to said slot.

21. A toaster as defined in claim 15, wherein a pair of toast retaining arms are pivoted to said support on opposite sides respectively relative to said slot, spring means is connected to said toast retaining arms and pivotally biases the latter in erected operative position relative to the support.

22. A toaster as defined in claim 21, wherein said body includes a toasting portion and a wall mounting portion, a hinge mechanism pivotally connects said toasting portion to said wall mounting portion and operatively pivots said toasting portion to an inoperative position flat against said wall mounting portion, said elongated support includes a shank portion displaceable into said wall mounting portion and an elongated carrying portion longitudinally registering with said slot, pivoted to said shank portion, and pivotally engaging in said slot upon closing of said toasting portion against said wall mounting portion, said toast retaining arms are pivoted to said elongated toast carrying portion and have each a free end slidable against said wall mounting portion against the bias of said spring means upon pivoting of said toasting portion to the inoperative position thereof, and a latch member is fixed to said toast carrying portion and engaged by said toasting portion thereby producing concurrent pivoting of the toast carrying portion with the toasting portion and retractive folding of said toast retaining arms inside said slot upon pivoting of the toasting portion to the inoperative position thereof.

* * * * *